US012315439B2

(12) United States Patent
Lee et al.

(10) Patent No.: US 12,315,439 B2
(45) Date of Patent: May 27, 2025

(54) STAGE AND ORGANIC LIGHT EMITTING DISPLAY DEVICE USING THE SAME

(71) Applicant: SAMSUNG DISPLAY CO., LTD., Yongin-si (KR)

(72) Inventors: Seung Kyu Lee, Yongin-si (KR); Seung Ji Cha, Yongin-si (KR); Ji Hyun Ka, Yongin-si (KR); Tae Hoon Kwon, Yongin-si (KR); Min Ku Lee, Yongin-si (KR); Jin Tae Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/141,040

(22) Filed: Apr. 28, 2023

(65) Prior Publication Data

US 2023/0260455 A1 Aug. 17, 2023

Related U.S. Application Data

(63) Continuation of application No. 17/407,412, filed on Aug. 20, 2021, now Pat. No. 11,640,788, which is a (Continued)

(30) Foreign Application Priority Data

Jun. 17, 2016 (KR) ........................ 10-2016-0075527

(51) Int. Cl.

*G09G 3/3225* (2016.01)
*G09G 3/3233* (2016.01)

(Continued)

(52) U.S. Cl.

CPC ......... *G09G 3/3225* (2013.01); *G09G 3/3233* (2013.01); *G09G 3/3266* (2013.01);

(Continued)

(58) Field of Classification Search

CPC .. G09G 3/3208; G09G 3/3225; G09G 3/3233; G09G 3/3266; G09G 3/3275;

(Continued)

(56) References Cited

U.S. PATENT DOCUMENTS 5,426,349 A * 6/1995 Nilssen ................ H05B 41/245
315/226
6,618,111 B1 9/2003 Nagata et al.

(Continued)

FOREIGN PATENT DOCUMENTS

CN 101281725 10/2008
CN 102592539 7/2012

(Continued)

OTHER PUBLICATIONS

Earthishome, Apr. 2006, https://electronics.stackexchange.com/questions/229658/can-current-flow-both-ways-through-a-transistor (Year: 2006)[Retrieved from internet, Jun. 2, 2019].

(Continued)

*Primary Examiner* — Julie Anne Watko
(74) *Attorney, Agent, or Firm* — F. CHAU & ASSOCIATES, LLC

(57) ABSTRACT

A stage including: an output circuit connected to a first node and a second node; an input connected to a third node and a fourth node; and a plurality of signal processors between the output and the input, the plurality of signal processors electrically connecting the first node and the third node and electrically connecting the second node and the fourth node, wherein the input includes: a seventh transistor connected between a first input terminal and the fourth node and having a gate electrode connected to a second input terminal; a plurality of eighth transistors serially connected between the third node and the second input terminal and having gate electrodes connected to the fourth node; and a ninth tran- (Continued)

sistor connected between the third node and a second power source and having a gate electrode connected to the second input terminal.

18 Claims, 7 Drawing Sheets

Related U.S. Application Data continuation of application No. 16/840,689, filed on Apr. 6, 2020, now Pat. No. 11,100,856, which is a continuation of application No. 16/429,228, filed on Jun. 3, 2019, now Pat. No. 10,614,754, which is a continuation of application No. 15/585,425, filed on May 3, 2017, now Pat. No. 10,311,781.

(51) Int. Cl.
*G09G 3/3208* (2016.01)
*G09G 3/3266* (2016.01)
*G09G 3/3275* (2016.01)

(52) U.S. Cl.
CPC ... *G09G 3/3275* (2013.01); *G09G 2300/0861* (2013.01); *G09G 2310/0286* (2013.01); *G09G 2310/08* (2013.01); *G09G 2330/02* (2013.01)

(58) Field of Classification Search
CPC ... G09G 2300/0842; G09G 2300/0861; G09G 2310/0286; G09G 2310/08; G09G 2330/02
See application file for complete search history.

(56) References Cited

U.S. PATENT DOCUMENTS

| | | | | |
|---|---|---|---|---|
| 8,339,424 | B2 | 12/2012 | Jeong et al. | |
| 8,816,728 | B2 * | 8/2014 | Yoon | G11C 19/28 377/64 |
| 9,001,013 | B2 | 4/2015 | Hung et al. | |
| 9,129,562 | B2 | 9/2015 | Jang et al. | |
| 9,368,069 | B2 | 6/2016 | Woo et al. | |
| 9,437,148 | B2 | 9/2016 | Koo et al. | |
| 9,437,324 | B2 | 9/2016 | Tan et al. | |
| 9,548,026 | B2 | 1/2017 | Jang | |
| 9,792,871 | B2 | 10/2017 | Zhao et al. | |
| 9,922,611 | B2 | 3/2018 | Zhao et al. | |
| 10,311,781 | B2 | 6/2019 | Lee et al. | |
| 10,614,732 | B2 | 4/2020 | Choi et al. | |
| 10,614,754 | B2 | 4/2020 | Lee et al. | |
| 11,100,856 | B2 | 8/2021 | Lee et al. | |
| 2003/0052848 | A1 | 3/2003 | Yamaguchi | |
| 2007/0052653 | A1 | 3/2007 | Shin | |
| 2008/0246739 | A1 | 10/2008 | Choi et al. | |
| 2009/0128476 | A1 | 5/2009 | Lee et al. | |
| 2009/0179888 | A1 | 7/2009 | Yamashita et al. | |
| 2010/0026619 | A1 | 2/2010 | Umezaki | |
| 2010/0085341 | A1 | 4/2010 | Hasegawa et al. | |
| 2010/0188316 | A1 | 7/2010 | Jang | |
| 2012/0081409 | A1 * | 4/2012 | Chung | G09G 3/3266 327/108 |
| 2012/0188290 | A1 | 7/2012 | Park et al. | |
| 2012/0320008 | A1 | 12/2012 | Takahashi et al. | |
| 2013/0044854 | A1 | 2/2013 | Yonemaru et al. | |
| 2013/0314139 | A1 | 11/2013 | Umezaki | |
| 2013/0328495 | A1 | 12/2013 | Woo et al. | |
| 2013/0342584 | A1 * | 12/2013 | Song | G09G 3/3266 345/690 |
| 2014/0055444 | A1 | 2/2014 | Jang | |
| 2014/0111092 | A1 | 4/2014 | Kim | |
| 2014/0337876 | A1 | 11/2014 | McCarthy et al. | |
| 2014/0353608 | A1 | 12/2014 | Kim et al. | |
| 2015/0035733 | A1 | 2/2015 | Woo et al. | |
| 2015/0061982 | A1 | 3/2015 | Woo | |
| 2016/0071614 | A1 | 3/2016 | Lee | |
| 2017/0337874 | A1 | 11/2017 | Toyomura et al. | |
| 2017/0337876 | A1 | 11/2017 | Kim et al. | |
| 2017/0337877 | A1 * | 11/2017 | Kim | G09G 3/3225 |
| 2017/0337878 | A1 | 11/2017 | Kim et al. | |
| 2017/0345366 | A1 | 11/2017 | Jang | |
| 2017/0352328 | A1 | 12/2017 | Jeong et al. | |
| 2017/0365211 | A1 | 12/2017 | Lee et al. | |
| 2018/0075810 | A1 * | 3/2018 | Kim | G09G 3/3266 |
| 2018/0330673 | A1 | 11/2018 | Kang et al. | |
| 2019/0019462 | A1 | 1/2019 | Kim et al. | |
| 2019/0130836 | A1 | 5/2019 | Liu et al. | |
| 2019/0287457 | A1 | 9/2019 | Lee et al. | |
| 2019/0295673 | A1 | 9/2019 | Umezaki | |
| 2019/0348442 | A1 | 11/2019 | Umezaki | |
| 2020/0152127 | A1 | 5/2020 | Kang et al. | |
| 2020/0234638 | A1 | 7/2020 | Lee et al. | |
| 2021/0193040 | A1 * | 6/2021 | Na | G09G 3/3266 |
| 2021/0383751 | A1 | 12/2021 | Lee et al. | |

FOREIGN PATENT DOCUMENTS

| | | |
|---|---|---|
| CN | 102760409 | 10/2012 |
| CN | 103474038 | 12/2013 |
| CN | 103632633 | 3/2014 |
| CN | 104765174 | 7/2015 |
| CN | 105304021 | 2/2016 |
| CN | 105321491 | 2/2016 |
| CN | 105405417 | 3/2016 |
| CN | 105469761 | 4/2016 |
| CN | 106920519 | 7/2017 |
| CN | 107527589 | 12/2017 |
| CN | 108461065 | 8/2018 |
| EP | 3258464 | 12/2017 |
| JP | 2003-101406 | 4/2003 |
| JP | 2009-077475 | 4/2009 |
| JP | 2014-41337 | 3/2014 |
| KR | 10-2012-0041425 | 5/2012 |
| KR | 10-2014-0025149 | 3/2014 |
| KR | 10-2017-0133578 | 12/2017 |

OTHER PUBLICATIONS

Extended European Search Report was issued from the European Patent Office dated Oct. 24, 2017 with respect to the European Patent Application No. 17176470.7.

Cao Kun et al., "An Integrated Gate Driving Circuit Employing IGZO TFTs for AMOLED," 2014 China FPD Conference, Oct. 22, 2014, pp. 224-227.

Chinese Office Action issued in corresponding Chinese Patent Application No. 201710462861.5 dated Jun. 25, 2021.

English machine translation of CN Decision of rejection (Chinese patent application No. 201710462861.5, dated Apr. 13, 2022).

* cited by examiner

STAGE AND ORGANIC LIGHT EMITTING DISPLAY DEVICE USING THE SAME

CROSS-REFERENCE TO RELATED APPLICATIONS

This application is a continuation of U.S. patent application Ser. No. 17/407,412 filed on Aug. 20, 2021, which is a continuation of U.S. patent application Ser. No. 16/840,689 filed on Apr. 6, 2020, now U.S. patent Ser. No. 11,100,856 issued on Aug. 24, 2021, which is a continuation of U.S. application Ser. No. 16/429,228, filed on Jun. 3, 2019, now U.S. Pat. No. 10,614,754 issued on Apr. 7, 2020, which is a continuation of U.S. application Ser. No. 15/585,425 filed on May 3, 2017, now U.S. Pat. No. 10,311,781, issued on Jun. 4, 2019, which claims priority under 35 USC. § 119 of Korean Patent Application No. 10-2016-0075527, filed on Jun. 17, 2016, in the Korean Intellectual Property Office, the disclosure of the above applications are incorporated by reference herein.

BACKGROUND

1. Field

One or more embodiments described herein relate to a stage and an organic light emitting display device including a stage.

2. Description of the Related Art

A variety of displays have been developed. Examples include liquid crystal displays and organic light emitting displays. An organic light emitting display generates an image based on light emitted from organic light emitting diodes (OLEDs). An OLED generates light based on a re-combination of electrons and holes in an emission layer.

One type of organic light emitting display includes a data driver for supplying data signals to data lines, a scan driver for supplying scan signals to scan lines, and an emission driver for supplying emission control signals to emission control lines. Pixels are connected to the data lines, the scan lines, and the emission control lines.

The pixels are selected when the scan signals are supplied to the scan lines. When selected, the pixels receive the data signals from the data lines. The pixels that receive the data signals emit light with predetermined brightness based on the data signals. Emission times of the pixels are controlled by the emission control signals supplied by the emission driver.

The emission driver includes stages respectively connected to the emission control lines. The stages generate the emission control signals based on clock signals and supply the generated emission control signals to the emission control lines.

Thus, the stages generate emission control signals to control emission times. When the emission control signals are unstable, the pixels may emit light components at undesired points of time.

SUMMARY

In accordance with one or more embodiments, a stage includes an output to supply a voltage of a first power source or a second power source to an output terminal based on voltages of a first node and a second node; an input to control voltages of a third node and a fourth node based on signals supplied to a first input terminal and a second input terminal-; a first signal processor to control the voltage of the first node based on the voltage of the second node; a second signal processor, connected to a fifth node, to control the voltage of the first node based on a signal supplied to a third input terminal; a third signal processor to control the voltage of the fourth node based on the voltage of the third node and the signal supplied to the third input terminal; and a first stabilizer connected between the second signal processor and the input to control voltage drop widths of the third node and the fourth node.

The first power source may have a gate-off voltage and the second power source may have a gate-on voltage. The first input terminal may receive an output signal of a previous stage or a start pulse. The output signal of the previous stage or the start pulse may be supplied to the first input terminal overlaps a clock signal supplied to the second input terminal at least once. The second input terminal may receive a first clock signal, and the third input terminal may receive a second clock signal. The first clock signal and the second clock signal may have a same period, and the second clock signal may be shifted from the first clock signal by a half period.

The first stabilizer may include a first transistor connected between the third node and the fifth node and having a gate electrode connected to the second power source; and a second transistor connected between the second node and the fourth node and having a gate electrode connected to the second power source.

The input may include a seventh transistor connected between the first input terminal and the fourth node and having a gate electrode connected to the second input terminal; an eighth transistor connected between the third node and the second input terminal and having a gate electrode connected to the fourth node; and a ninth transistor connected between the third node and the second power source and having a gate electrode connected to the second input terminal.

The output may include a tenth transistor connected between the first power source and the output terminal and having a gate electrode connected to the first node; and an $11^{th}$ transistor connected between the second power source and the output terminal and having a gate electrode connected to the second node.

The first signal processor may include a 12th transistor connected between the first power source and the first node and having a gate electrode connected to the second node; and a third capacitor connected between the first power source and the first node.

The second signal processor may include a first capacitor connected between the second node and third input terminal; a second capacitor having a first terminal connected to the fifth node; a fifth transistor connected between the second terminal of the second capacitor and the first node and having a gate electrode connected to the third input terminal; and a sixth transistor connected between the second terminal of the second capacitor and the third input terminal and having a gate electrode connected to the fifth node.

The third signal processor may include a $13^{th}$ transistor and a $14^{th}$ transistor serially connected between a first power source and the fourth node, a gate electrode of the $13^{th}$ transistor may be connected to the third node, and a gate electrode of the $14^{th}$ transistor may be connected to the third input terminal.

The stage may include a second stabilizer connected to the first power source, the first node, and the third input terminal to uniformly maintain the voltage of the second node in a period in which the voltage of the first power source is to be output to the output terminal. The second stabilizer may include a third transistor connected between the first power source and a sixth node and having a gate electrode connected to the first node; a fourth transistor connected between the sixth node and the third input terminal and having a gate electrode connected to the second node; and a first capacitor connected between the second node and the sixth node.

The second signal processor may include a second capacitor having a first terminal connected to the fifth node; a fifth transistor connected between the second terminal of the second capacitor and the first node and having a gate electrode connected to the third input terminal; and a sixth transistor connected between the second terminal of the first capacitor and the third input terminal and having a gate electrode connected to the fifth node.

In accordance with one or more other embodiments, an organic light emitting display device includes pixels connected to scan lines, data lines, and emission control lines; a scan driver to supply scan signals to the scan lines; a data driver to supply data signals to the data lines; and an emission driver including a plurality of stages to supply emission control signals to the emission control lines, wherein each of the stages includes: an output to supply a voltage of a first power source or a second power source to an output terminal based on voltages of a first node and a second node; an input to control voltages of a third node and a fourth node based on signals supplied to a first input terminal and a second input terminal; a first signal processor to control the voltage of the first node based on the voltage of the second node; a second signal processor, connected to a fifth node, to control the voltage of the first node based on a signal supplied to a third input terminal; a third signal processor to control the voltage of the fourth node based on the voltage of the third node and the signal supplied to the third input terminal; and a first stabilizer connected between the second signal processor and the input to control voltage drop widths of the third node and the fourth node.

The first power source may have a gate-off voltage, the second power source may have a gate-on voltage, and the voltage of the first power source supplied to the output terminal may be an emission control signal. The first input terminal may receive an output signal of a previous stage or a start pulse, the second input terminal of a jth (j is an odd number or an even number) stage may receive a first clock signal and the third input terminal of the jth stage is to receive a second clock signal, and the second input terminal of a (j+1)th stage may receive the second clock signal and the third input terminal of the (j+1)th stage is to receive the first clock signal.

The first stabilizer may include a first transistor connected between the third node and the fifth node and having a gate electrode connected to the second power source; and a second transistor connected between the second node and the fourth node and having a gate electrode connected to the second power source.

The organic light emitting display device may include a second stabilizer connected to the first power source, the first node, and the third input terminal to uniformly maintain the voltage of the second node in a period in which the voltage of the first power source is output to the output terminal, wherein the second stabilizer includes: a third transistor connected between the first power source and a sixth node and having a gate electrode connected to the first node; a fourth transistor connected between the sixth node and the third input terminal and having a gate electrode connected to the second node; and a first capacitor connected between the second node and the sixth node.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
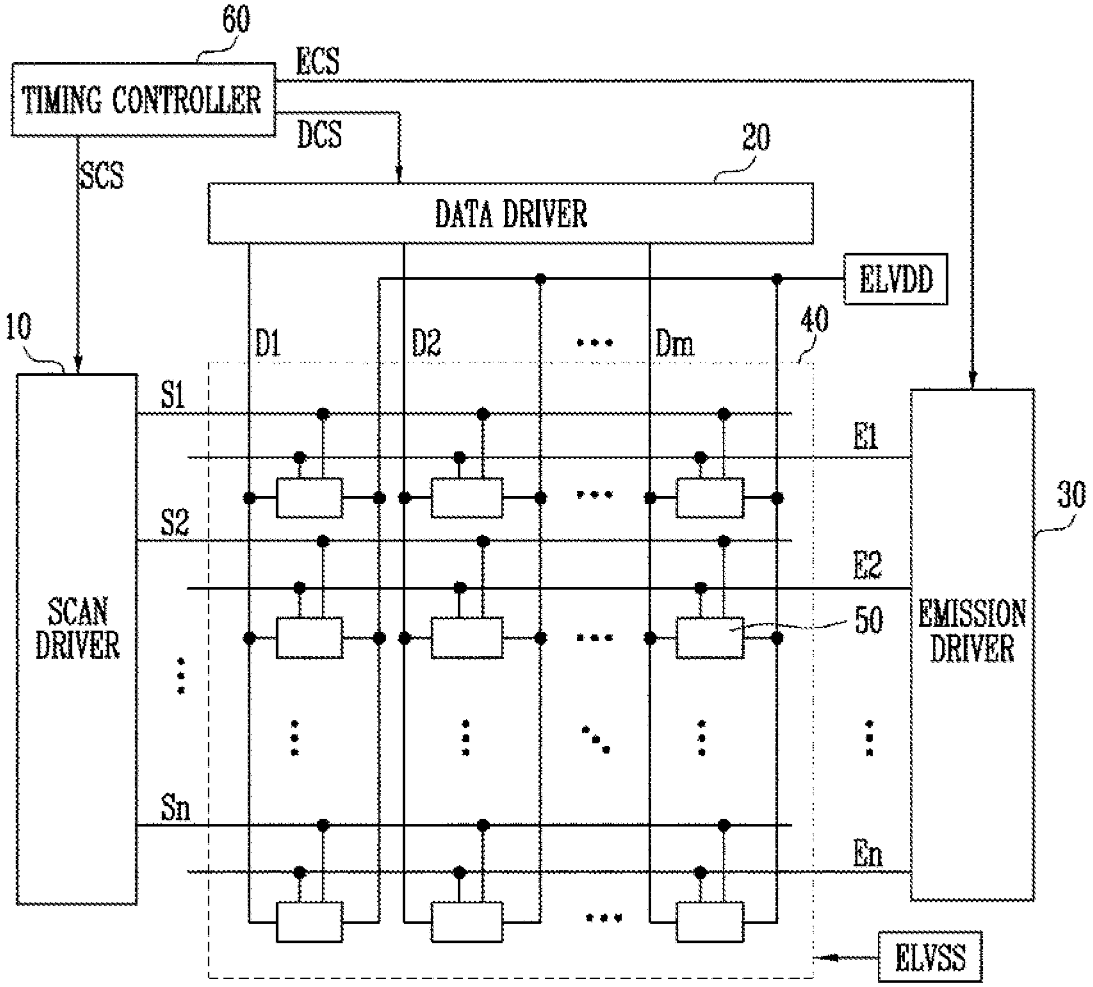
FIG. 1 illustrates an embodiment of an organic light emitting display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of an organic light emitting display device which includes a scan driver 10, a data driver 20, an emission driver 30, a pixel unit 40, and a timing controller 60. The timing controller 60 generates a data driving control signal DCS, a scan driving control signal SCS, and an emission driving control signal ECS based on synchronizing signals supplied from the outside. The data driving control signal DCS generated by the timing controller 60 is supplied to the data driver 20. The scan driving control signal SCS generated by the timing controller 60 is supplied to the scan driver 10. The emission driving control signal ECS generated by the timing controller 60 is supplied to the emission driver 30.

The scan driving control signal SCS includes a start pulse and clock signals. The start pulse controls first timings of scan signals. The clock signals shift the start pulse.

The emission driving control signal ECS includes a start pulse and clock signals. The start pulse controls first timings of emission control signals. The clock signals shift the start pulse.

The data driving control signal DCS includes a source start pulse and clock signals. The source start pulse controls a sampling start point of time of data. The clock signals control a sampling operation.

The scan driver 10 receives the scan driving control signal SCS from the timing controller 60. The scan driver 10 that receives the scan driving control signal SCS supplies the scan signals to scan lines S1 through Sn. For example, the scan driver 10 may sequentially supply the scan signals to the scan lines S1 through Sn. When the scan signals are sequentially supplied to the scan lines S1 through Sn, pixels 50 are selected in units of horizontal lines.

The emission driver 30 receives the emission driving control signal ECS from the timing controller 60. The emission driver 30 that receives the emission driving control signal ECS supplies the emission control signals to emission control lines E1 through En. For example, the emission driver 30 may sequentially supply the emission control signals to the emission control lines E1 through En. The emission control signals control emission times of the pixels 50. For example, a specific pixel 50 that receives an emission control signal is set to be in a non-emission state in a period in which the emission control signal is supplied and may be set in an emission state in another period.

The emission control signals may have gate-off voltages (for example, high voltages) to turn off transistors in the pixels 50. The scan signals may have gate-on voltages (for example, low voltages) to turn on the transistors in the pixels 50.

The data driver 20 receives the data driving control signal DCS from the timing controller 60. The data driver 20 that receives the data driving control signal DCS supplies data signals to data lines D1 through Dm. The data signals supplied to the data lines D1 through Dm are supplied to the pixels 50 selected by the scan signals. For this purpose, the data driver 20 may supply the data signals to the data lines D1 through Dm in synchronization with the scan signals.

The pixel unit 40 includes the pixels 50 connected to the scan lines S1 through Sn, the data lines D1 through Dm, and the emission control lines E1 through En. The pixel unit 40 receives a first driving power source ELVDD and a second driving power source ELVSS from an external source.

Each of the pixels 50 includes a driving transistor and an organic light emitting diode (OLED). The driving transistor controls an amount of current that flows from the first driving power source ELVDD to the second driving power source ELVSS, via the OLED, based on a data signal.

In FIG. 1, the n scan lines S1 through Sn and the n emission control lines E1 through En are illustrated. In another embodiment, no less than one dummy scan line and dummy emission control line may be additionally formed in the pixel unit 40 to correspond to circuit structures of the pixels 50.

Figure 2:
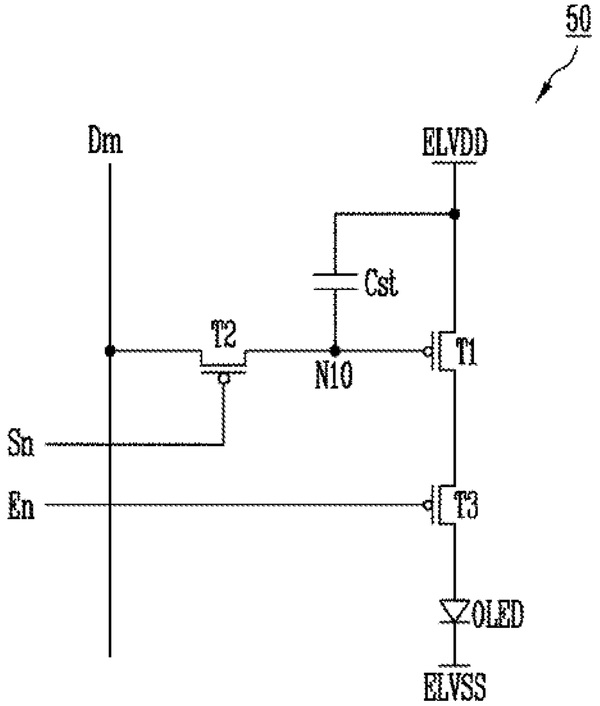
FIG. 2 illustrates an embodiment of a pixel.

FIG. 2 illustrates an embodiment of a pixel, which, for example, may be representative of the pixels 50 in FIG. 1. For convenience sake, the pixel is one connected to the nth scan line Sn and the mth data line Din.

Referring to FIG. 2, the pixel 50 includes an OLED a first transistor T1 (a driving transistor), a second transistor T2, a third transistor T3, and a storage capacitor Cst. The OLED has an anode electrode connected to a second electrode of the third transistor T3 and a cathode electrode connected to the second driving power source ELVSS. The OLED emits light with predetermined brightness based on an amount of current supplied from the first transistor T1.

The first transistor T1 has a first electrode connected to the first driving power source ELVDD and a second electrode connected to a first electrode of the third transistor T3. A gate electrode of the first transistor T1 is connected to a tenth node N10. The first transistor T1 controls the amount of current supplied from the first driving power source ELVDD to the second driving power source ELVSS, via the third transistor T3 and the OLED, based on the voltage of the tenth node N10.

The second transistor T2 has a first electrode connected to the data line Dm and a second electrode connected to the tenth node N10. A gate electrode of the second transistor T2 is connected to the scan line Sn. The second transistor T2 is turned on when the scan signal is supplied to the scan line Sn and supplies the data signal from the data line Dm to the tenth node N10.

The third transistor T3 has a first electrode connected to the second electrode of the first transistor T1, a second electrode connected to the anode electrode of the OLED, and a gate electrode connected to the emission control line En. The third transistor T3 is turned off when the emission control signal is supplied to the emission control line En and is turned on when the emission control signal is not supplied.

When the third transistor T3 is turned off, the first transistor t1 and the OLED are electrically isolated so that the pixel 50 is set to be in a non-emission state. When the third transistor T3 is turned on, the first transistor T1 and the OLED are electrically connected so that the pixel 50 is set to be in an emission state.

The storage capacitor Cst is connected between the first driving power source ELVDD and the tenth node N10. The storage capacitor Cst charges the voltage of the tenth node N10.

In another embodiment, the pixel 50 may have a different configuration with a different number of transistors and/or capacitors and which is controlled in an emission period based on an emission control signal.

Figure 3:
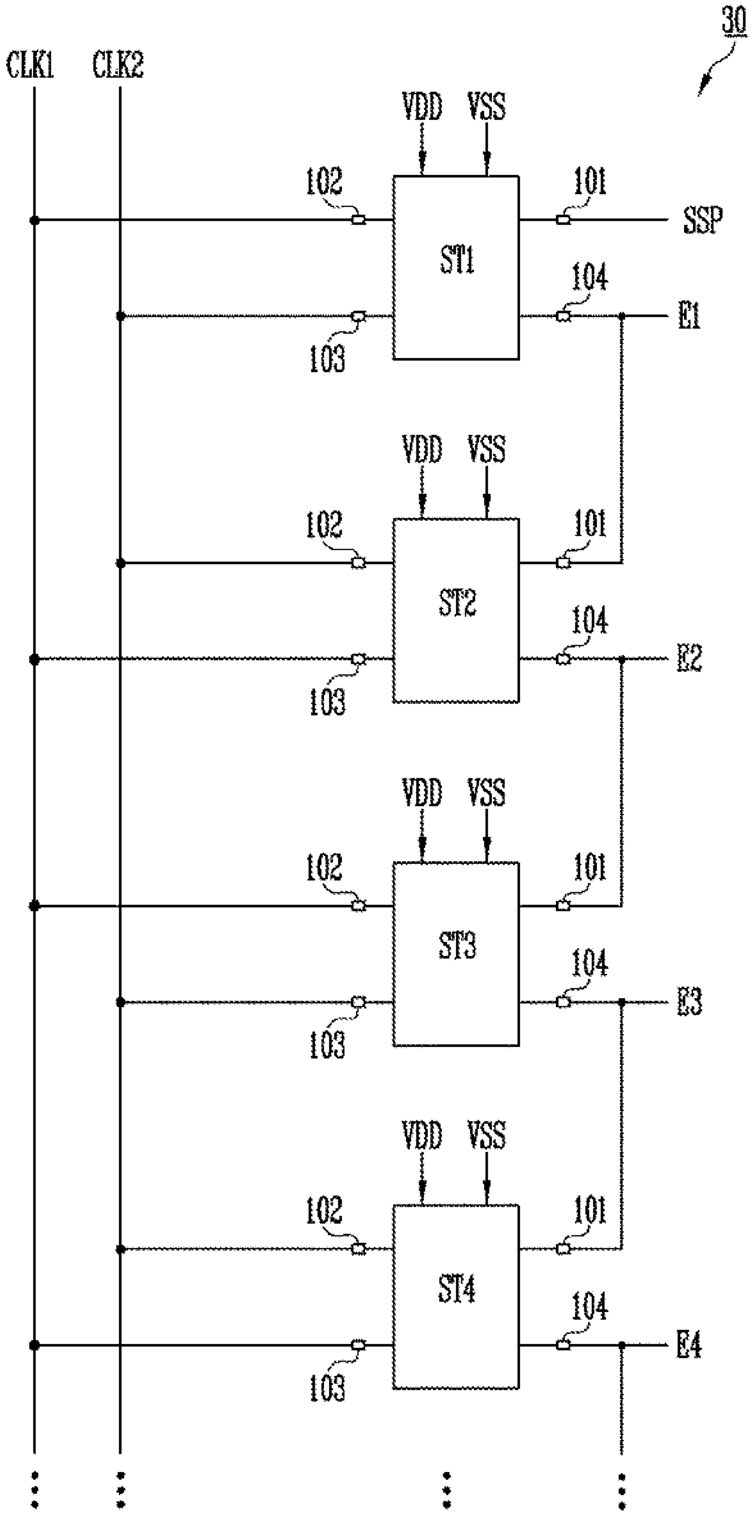
FIG. 3 illustrates an embodiment of an emission driver.

FIG. 3 illustrates an embodiment of the emission driver 30 of FIG. 1. Referring to FIG. 3 the emission driver 30 includes a plurality of stages ST1 through ST4. Each of the stages ST1 through ST4 is connected to one of the emission control lines E1 through E4 and is driven based on clock signals CLK1 and CLK2. The stages ST1 through ST4 may be implemented, for example, by the same circuit.

Each of the stages ST1 through ST4 includes a first input terminal 101, a second input terminal 102, a third input terminal 103, and an output terminal 104. The first input terminal 101 receives an output signal (that is, an emission control signal) of a previous stage or a start pulse SSP. For example, the first input terminal 101 of the first stage ST1 receives the start pulse SSP and the first input terminals 101 of the remaining stages ST2 through ST4 may receive output signals of previous stages.

A second input terminal 102 of a jth (j is an odd number or an even number) stage STj receives the first clock signal CLK1 and the third input terminal 103 of the jth stage STj receives the second clock signal CLK2. A second input terminal 102 of a (j+i)th stage STj+1 receives the second clock signal CLK2 and the third input terminal 103 of the (j+i)th stage STj+1 receives the first clock signal CLK1.

The first clock signal CLK1 and the second clock signal CLK2 have the same period and do not have overlapping phases. For example, the second clock signal CLK2 may be shifted from the first clock signal CLK1, for example, by a half period.

In addition, the stages ST1 through ST4 receive a first power source VDD and a second power source VSS. The first power source VDD may be set to a gate-off voltage. The second power source VSS may be set to a gate-on voltage. The first power source VDD supplied to the output terminal 104 may serve as an emission control signal.

Figure 4:
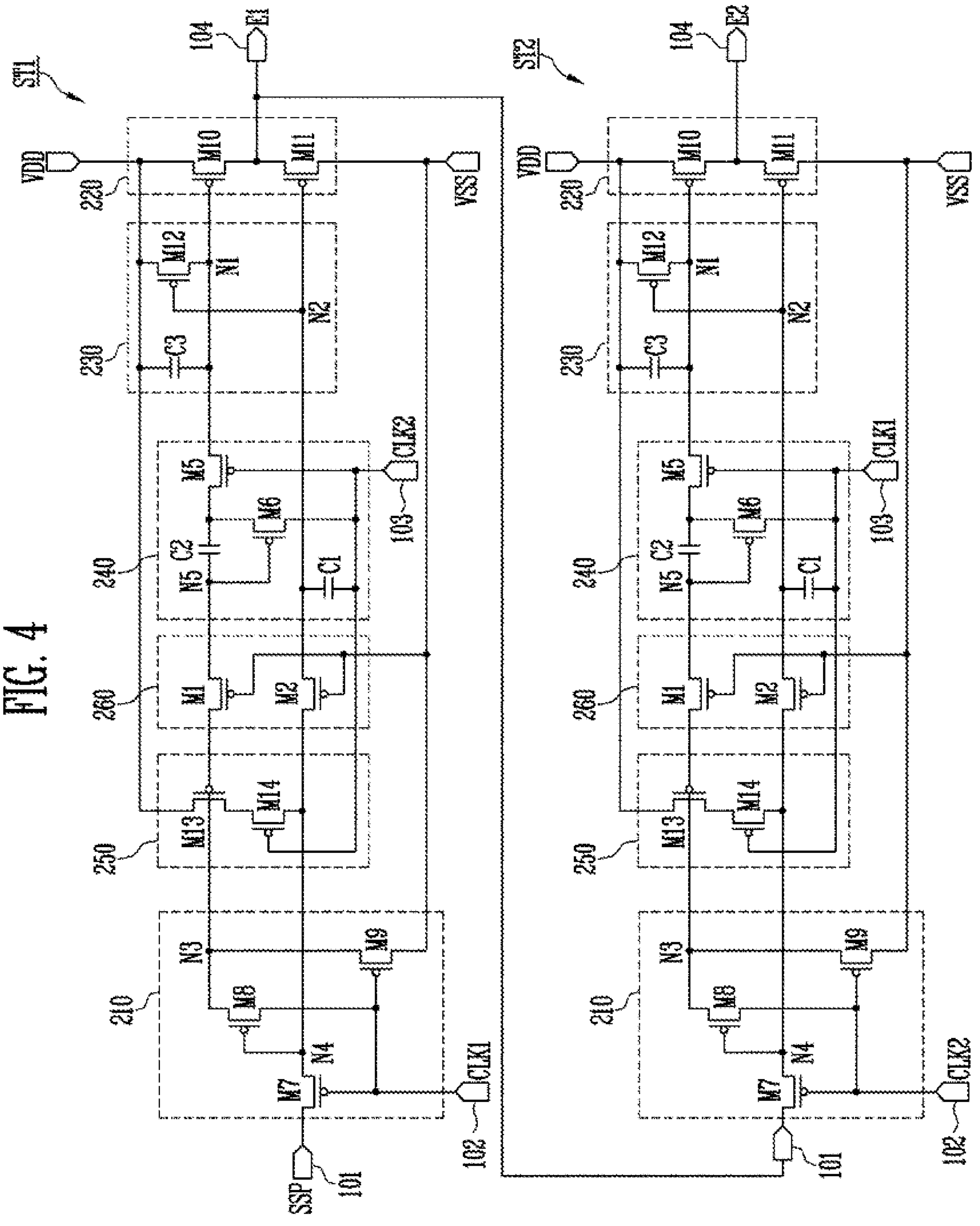
FIG. 4 illustrates an embodiment of a stage.

FIG. 4 illustrates an embodiment of the stage of FIG. 3. In FIG. 4, for convenience sake, the first stage ST1 and the second stage ST2 are illustrated.

Referring to FIG. 4, the first stage ST1 includes an input unit 210, an output unit 220, a first signal processing unit 230, a second signal processing unit 240, a third signal processing unit 250, and a first stabilizing unit 260. The output unit 220 supplies a voltage of the first power source VDD or the second power source VSS to the output terminal 104 based on voltages of a first node N1 and a second node N2. For this purpose, the output unit 220 includes a tenth transistor M10 and an 11$^{th}$ transistor M11.

The tenth transistor M10 is connected between the first power source VDD and the output terminal 104. A gate electrode of the tenth transistor M10 is connected to the first node N1. The tenth transistor M10 is turned on or off based on the voltage of the first node N1 The voltage of the first power source VDD supplied to the output terminal 104 when the tenth transistor M10 is turned on may serve as the emission control signal of the first emission control line E1.

The 11$^{th}$ transistor M11 is connected between the output terminal 104 and the second power source VSS. A gate electrode of the 11$^{th}$ transistor M11 is connected to the second node N2 The 11$^{th}$ transistor M11 is turned on or off based on the voltage of the second node N2.

The input unit 210 controls voltages of a third node N3 and a fourth node N4 based on the signals supplied to the first input terminal 101 and the second input terminal 102. The input unit 210 includes seventh through ninth transistors M7 through M9.

The seventh transistor M7 is connected between the first input terminal 101 and the fourth node N4. A gate electrode of the seventh transistor M7 is connected to the second input terminal 102. The seventh transistor M7 is turned on when the first clock signal CLK1 is supplied to the second input terminal 102 and electrically connects the first input terminal 101 and the fourth node N4.

The eighth transistor M8 is connected between the third node N3 and the second input terminal 102. A gate electrode of the eighth transistor M8 is connected to the fourth node N4. The eighth transistor M8 is turned on or off based on the voltage of the fourth node N4.

The ninth transistor M9 is connected between the third node N3 and the second power source VSS. A gate electrode of the ninth transistor M9 is connected to the second input terminal 102. The ninth transistor M9 is turned on when the first clock signal CLK1 is supplied to the second input terminal 102 and supplies the voltage of the second power source VSS to the third node N3.

The first signal processing unit 230 controls the voltage of the first node N1 based on the voltage of the second node N2. For this purpose, the first signal processing unit 230 includes a 12$^{th}$ transistor M12 and a third capacitor C3.

The 12$^{th}$ transistor M12 is connected between the first power source VDD and the first node N1. A gate electrode of the 12$^{th}$ transistor M12 is connected to the second node N2. The 12$^{th}$ transistor M12 is turned on or off based on the voltage of the second node N2.

The third capacitor C3 is connected between the first power source VDD and the first node N1. The third capacitor C3 charges the voltage applied to the first node N1 In addition, the third capacitor C3 stably maintains the voltage of the first node N1.

The second signal processing unit 240 is connected to a fifth node N5 and controls the voltage of the first node N1 based on a signal supplied to the third input terminal 103. For this purpose, the second signal processing unit 240 includes a fifth transistor M5, a sixth transistor M6, a first capacitor C1, and a second capacitor C2.

The first capacitor C1 is connected between the second node N2 and the third input terminal 103. The first capacitor C1 charges the voltage applied to the second node N2. In addition, the first capacitor C1 controls the voltage of the second node N2 based on the second clock signal CLK2 supplied to the third input terminal 103.

The second capacitor C2 has a first terminal connected to the fifth node N5 and a second terminal connected to the fifth transistor M5.

The fifth transistor M5 is connected between a second terminal of the second capacitor C2 and the first node N1. A gate electrode of the fifth transistor M5 is connected to the third input terminal 103. The fifth transistor M5 is turned on when the second clock signal CLK2 is supplied to the third input terminal 103 and electrically connects the second terminal of the second capacitor C2 and the first node N1.

The sixth transistor M6 is connected between the second terminal of the second capacitor C2 and the third input terminal 103. A gate electrode of the sixth transistor M6 is connected to the fifth node N5. The sixth transistor M6 is turned on or off based on a voltage of the fifth node N5.

The third signal processing unit 250 controls the voltage of the fourth node N4 based on the voltage of the third node N3 and the signal supplied to the third input terminal 103. For this purpose, the third signal processing unit 250 includes a 13$^{th}$ transistor M13 and a 14$^{th}$ transistor M14.

The 13$^{th}$ transistor M13 and the 14$^{1}$ transistor M14 are serially connected between the first power source VDD and the fourth node N4. A gate electrode of the 13$^{th}$ transistor M13 is connected to the third node N3. The 13$^{th}$ transistor M13 is turned on or off based on the voltage of the third node N3. In addition, a gate electrode of the 14$^{th}$ transistor M14 is connected to the third input terminal 103. The 14$^{th}$ transistor M14 is turned on when the second clock signal CLK2 is supplied to the third input terminal 103.

The first stabilizing unit 260 is connected between the second signal processing unit 240 and the input unit 210. The first stabilizing unit 260 limits voltage drop widths of the third node N3 and the fourth node N4. For this purpose, the first stabilizing unit 260 includes a first transistor M1 and a second transistor M2.

The first transistor M1 is connected between the third node N3 and the fifth node N5. A gate electrode of the first transistor M1 is connected to the second power source VSS. The first transistor M1 is set to be in a turn-on state.

The second transistor M2 is connected between the second node N2 and the fourth node N4. A gate electrode of the second transistor M2 is connected to the second power source VSS. The second transistor M2 is set to be in a turn-on state.

The second stage ST2 may have the same configuration as the first stage ST1 excluding signals supplied to first input terminal 101 through third input terminal 103.

Figure 5:
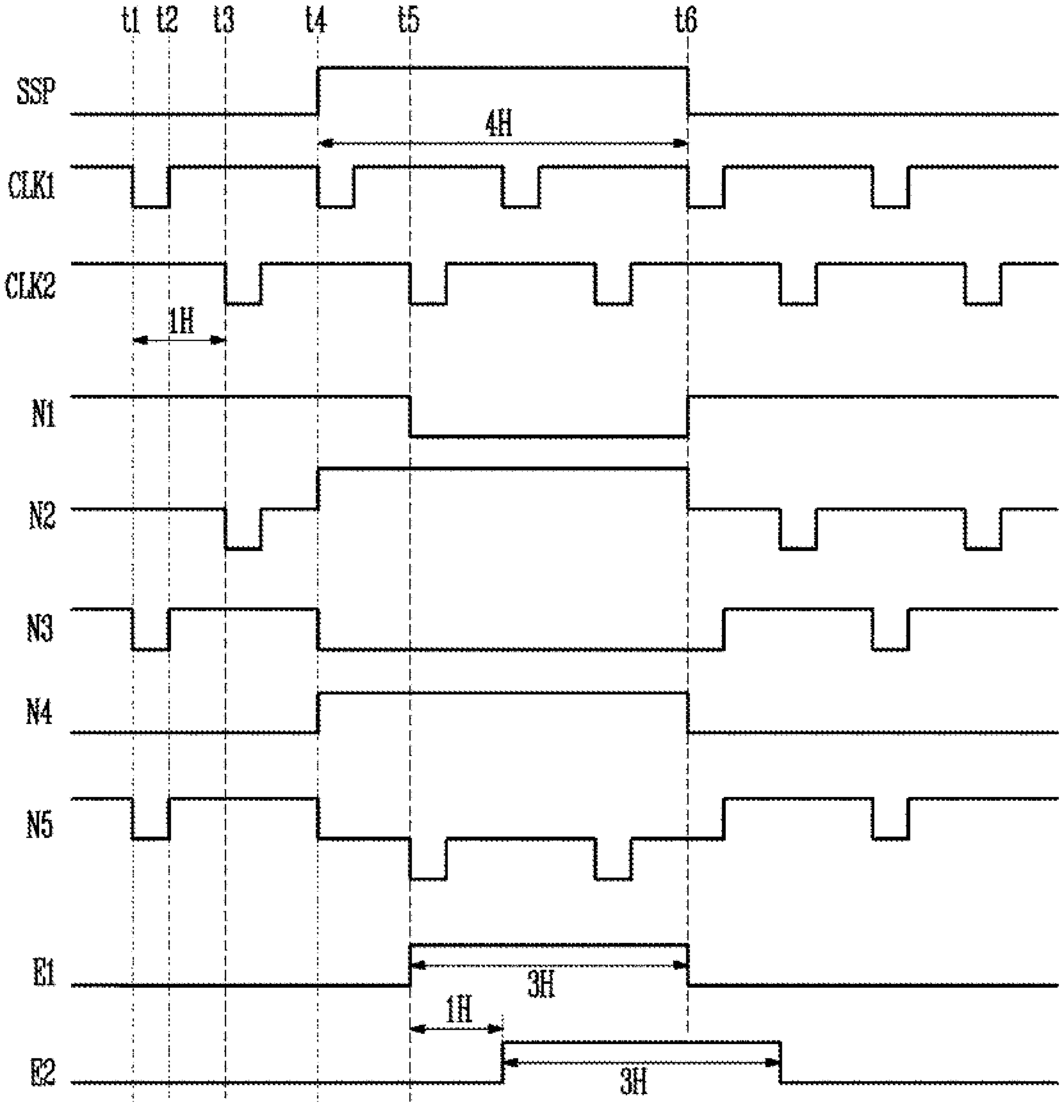
FIG. 5 illustrates an embodiment of a method for driving a stage.

FIG. 5 illustrates an embodiment of a waveform diagram of a method for driving the stage of FIG. 4. In FIG. 5, for convenience sake, operation processes will be described using the first stage ST.

Referring to FIG. 5, the first clock signal CLK1 and the second clock signal CLK2 have periods of 2 horizontal periods 2H and are supplied in different horizontal periods. The second clock signal CLK2 is shifted from the first clock signal CLK1, for example, by a half period (that is, a 1 horizontal period 1H).

When the start pulse SSP is supplied, the first input terminal 101 is set to have the voltage of the first power source VDD. When the start pulse SSP is not supplied, the first input terminal 101 may be set to have the voltage of the second power source VSS.

When the clock signals CLK11 and CLK2 are supplied, the second input terminal 102 and the third input terminal 103 are set to have the voltage of the second power source VSS. When the clock signals CLK1 and CILK2 are not supplied, the second input terminal 102 and the third input terminal 103 may be set to have the voltage of the first power source VDD.

In addition, the start pulse SSP supplied to the first input terminal 101 overlaps the first clock signal CLK1 supplied to the second input terminal 102 at least once. The start pulse SSP may be supplied in a period with a greater width than the first clock signal CLK1, for example, in a four horizontal period 4H. The first emission control signal supplied to the first input terminal 101 of the second stage ST2 overlaps the second clock signal CLK2 supplied to the second input terminal 102 of the second stage ST2 at least once.

In describing the operation processes, first, the first clock signal CLK1 is supplied to the second input terminal 102 at a first point of time t1. When the first clock signal CLK1 is supplied to the second input terminal 102, the seventh transistor M7 and the ninth transistor M9 are turned on.

When the seventh transistor M7 is turned on, the first input terminal 101 and the fourth node N4 are electrically connected. Since the second transistor M2 maintains the turn-on state, the first input terminal 101 is electrically connected to the second node N2 via the fourth node N4. At this time, the start pulse SSP is not supplied to the first input terminal 101 at the first point of time t1, so that a low voltage (for example, VSS) is supplied to the fourth node N4 and the second node N2.

When the low voltage is supplied to the second node N2 and the fourth node N4, the eighth transistor M8, the $11^{th}$ transistor M11, and the $12^{th}$ transistor M12 are turned on. When the $12^{th}$ transistor M12 is turned on, the voltage of the first power source VDD is supplied to the first node N1 so that the tenth transistor M10 is turned off. At this time, a voltage corresponding to turning-off of the tenth transistor M10 is charged in the third capacitor C3.

When the $11^{th}$ transistor M11 is turned on, the voltage of the second power source VSS is supplied to the output terminal 104. Therefore, at the first point of time t1, the emission control signal is not supplied to the first emission control line E1.

When the eighth transistor M8 is turned on, the first clock signal CLK1 is supplied to the third node N3. Since the first transistor M1 maintains the turn-on state, the first clock signal CLK1 is supplied to the fifth node N5 via the third node N3.

When the ninth transistor M9 is turned on, the voltage of the second power source VSS is supplied to the third node N3 and the fifth node N5. The first clock signal CLK1 is set to have the voltage of the second power source VSS, so that the third node N3 and the fifth node N5 are stably set to have the voltage of second power source VSS.

When the third node N3 and the fifth node N5 are set to have the voltage of the second power source VSS, the $13^{th}$ transistor M13 and the sixth transistor M6 are turned on. When the sixth transistor M6 is turned on, a high voltage (for example, VDD) from the third input terminal 103 is supplied to the second terminal of the second capacitor C2. At this time, since the fifth transistor M5 is set to be in a turn-off state, the first node N1 maintains the voltage of the first power source VDD regardless of the voltage of the fifth node N5 and a voltage of the second terminal of the second capacitor C2.

When the $13^{th}$ transistor M13 is turned on, the voltage of the first power source VDD is supplied to the $14^{th}$ transistor M14. At this time, the $14^{th}$ transistor M14 is set to be in a turn-off state so that the fourth node N4 maintains a low voltage.

At a second point of time t2, supply of the first clock signal CLK1 to the second input terminal 102 is stopped. When the supply of the first clock signal CLK1 is stopped, the seventh transistor M7 and the ninth transistor M9 are turned off. At this time, the second node N2 and the first node N1 maintain voltages in a previous period by the first capacitor C1 and the third capacitor C3.

When the second node N2 maintains a low voltage, the eighth transistor M8, the $11^{th}$ transistor M11, and the $12^{th}$ transistor m12 are turned on. When the eighth transistor M8 is turned on, a high voltage from the second input terminal 102 is supplied to the third node N3 and the fifth node N5. Then, the $13^{th}$ transistor M13 and the sixth transistor M6 are set to be in turn-off states.

When the $12^{th}$ transistor M12 is turned on, the voltage of the first power source VDD is supplied to the first node N1 so that the tenth transistor M10 maintains a turn-off state. When the $11^{th}$ transistor M11 is turned on, the output terminal 104 receives the voltage of the second power source VSS.

At a third point of time t3, the second clock signal CLK2 is supplied to the third input terminal 103. When the second clock signal CLK2 is supplied to the third input terminal 103, the $14^{th}$ transistor M14 and the fifth transistor M5 are turned on. When the fifth transistor M5 is turned on, the second terminal of the second capacitor C2 and the first node N1 are electrically connected. At this time, the first node N1 maintains the voltage of the first power source VDD.

When the $14^{th}$ transistor M14 is turned on, a second electrode of the $13^{th}$ transistor M13 and the second node N2 are electrically connected. At this time, since the $13^{th}$ transistor M13 is set to be in a turn-off state, the voltage of the first power source VDD is not supplied to the fourth node N4 and the second node N2.

In addition, when the second clock signal CLK2 is supplied to the third input terminal 103, the voltage of the second node N2 is reduced to a voltage lower than the voltage of the second power source VSS by coupling of the first capacitor C1. Then, a voltage applied to the $11^{th}$ transistor M11 and the gate electrode of the $12^{th}$ transistor M12 is reduced to a voltage lower than the voltage of the second power source VSS, so that driving characteristics of the transistors may be improved.

The fourth node N4 maintains the voltage of the second power source VSS regardless of the drop in voltage of the second node N2 by the second transistor M2. For example, since the voltage of the second power source VSS is applied to the gate electrode of the second transistor M2, the fourth node N4 maintains the voltage of the second power source VSS regardless of the drop in voltage of the second node N2. In this case, a voltage difference between the first electrode and the second electrode (e.g., between a source electrode and a drain electrode of the seventh transistor M7) is reduced or minimized. Thus, it is possible to prevent the characteristics of the seventh transistor M1 from changing.

At a fourth point of time t4, the start pulse SSP is supplied to the first input terminal 101 and the first clock signal CLK1 is supplied to the second input terminal 102. When the first clock signal CLK1 is supplied to the second input terminal 102, the seventh transistor M7 and the ninth transistor M9 are turned on. When the seventh transistor M7 is turned on, the first input terminal 101 is electrically connected to the fourth node N4 and the second node N2. Then, the fourth node N4 and the second node N2 are set to have high voltages by the start pulse SSP supplied to the second input terminal 102. When the fourth node N4 and the second node N2 are set to have the high voltages, the eighth transistor M8, the $11^{th}$ transistor M11, and the $12^{th}$ transistor M12 are turned off.

When the ninth transistor M9 is turned on, the voltage of the second power source VSS is supplied to the third node N3 and the fifth node N5. When the voltage of the second power source VSS is supplied to the third node N3 and the fifth node N5, the $13^{th}$ transistor M13 and the sixth transistor M6 are turned on. At this time, although the $13^{th}$ transistor M13 is turned on, since the $14^{th}$ transistor M14 is set to be in a turn-off state, the voltage of the fourth node N4 does not change.

When the sixth transistor M6 is turned on, the second terminal of the second capacitor C2 and the third input terminal 103 are electrically connected. At this time, since the fifth transistor M5 is set to be in a turn-off state, the first node N1 maintains a high voltage.

At a fifth point of time t5, the second clock signal CLK2 is supplied to the second input terminal 103. When the second clock signal CLK2 is supplied to the second input terminal 103, the $14^{th}$ transistor M14 and the fifth transistor M5 are turned on. Since the third node N3 and the fifth node N5 are set to have the voltage of the second power source VSS at the fifth point of time t5, the $13^{th}$ transistor M13 and the sixth transistor M6 maintain turn-on states.

When the fifth transistor M5 and the sixth transistor M6 are turned on, the second clock signal CLK2 is supplied to the first node N1. When the second clock signal CLK2 is supplied to the first node N1, the tenth transistor M10 is turned on. When the tenth transistor M10 is turned on, the voltage of the first power source VDD is supplied to the output terminal 104. The voltage of the first power source VDD supplied to the output terminal 104 is supplied to the first emission control line E1 as the emission control signal.

When the $13^{th}$ transistor M13 and the $14^{th}$ transistor M14 are turned on, the voltage of the second power source VDD is supplied to the fourth node N4 and the second node N2. Then, the eighth transistor M8 and the $11^{th}$ transistor M11 stably maintain turn-off states.

When the second clock signal CLK2 is supplied to the second terminal of the second capacitor C2, the voltage of the fifth node N5 is reduced to a voltage lower than the voltage of the second power source VSS by coupling of the second capacitor C2. Then, a voltage applied to the gate electrode of the sixth transistor M6 is reduced to a voltage lower than the voltage of the second power source VSS, As a result, the driving characteristics of the sixth transistor M6 may be improved.

In addition, the voltage of the third node N3 maintains the voltage of the second power source VSS by the first transistor M1 regardless of the voltage of the fifth node N5. For example, since the voltage of the second power source VSS is applied to the gate electrode of the first transistor M1, regardless of the drop in voltage of the fifth node N5, the third node N3 maintains the voltage of the second power source VSS. In this case, a voltage difference between a source electrode and a drain electrode of the eighth transistor M8 is reduced or minimized, and thus it is possible to prevent characteristics of the eighth transistor M8 from changing.

At a sixth point of time t6, the first clock signal CLK1 is supplied to the second input terminal 102. When the first clock signal CLK1 is supplied to the second input terminal 102, the seventh transistor M7 and the ninth transistor M9 are turned on. When the seventh transistor M7 is turned on, the fourth node N4 and the second node N2 are electrically connected to the first input terminal 101 so that a low voltage from the first input terminal 101 is supplied to the fourth node N4 and the second node N2. When the fourth node N4 and the second node N2 are set to have low voltages, the eighth transistor M8, the $11^{th}$ transistor M11, and the $12^{th}$ transistor M12 are turned on.

When the eighth transistor M8 is turned on, the first clock signal CLK1 is supplied to the third node N3 and the fifth node N5. When the $12^{th}$ transistor M12 is turned on, the voltage of the first power source VDD is supplied to the first node N1 so that the tenth transistor M10 is turned off. When the $11^{th}$ transistor M11 is turned on, the voltage of the second power source VSS is supplied to the output terminal 104. The voltage of the second power source VSS supplied to the output terminal 104 is supplied to the first emission control line E1. As a result, supply of the emission control signal to the first emission control line E1 is stopped.

The second stage ST2 that receives the emission control signal from the output terminal 104 of the first stage ST1 supplies the emission control signal to the second emission control line E2 while repeating the above-described processes. Thus, the emission stages ST according to the present embodiment may sequentially supply the emission control signals to the emission control lines E1 through En while repeating the above-described processes.

Figure 6:
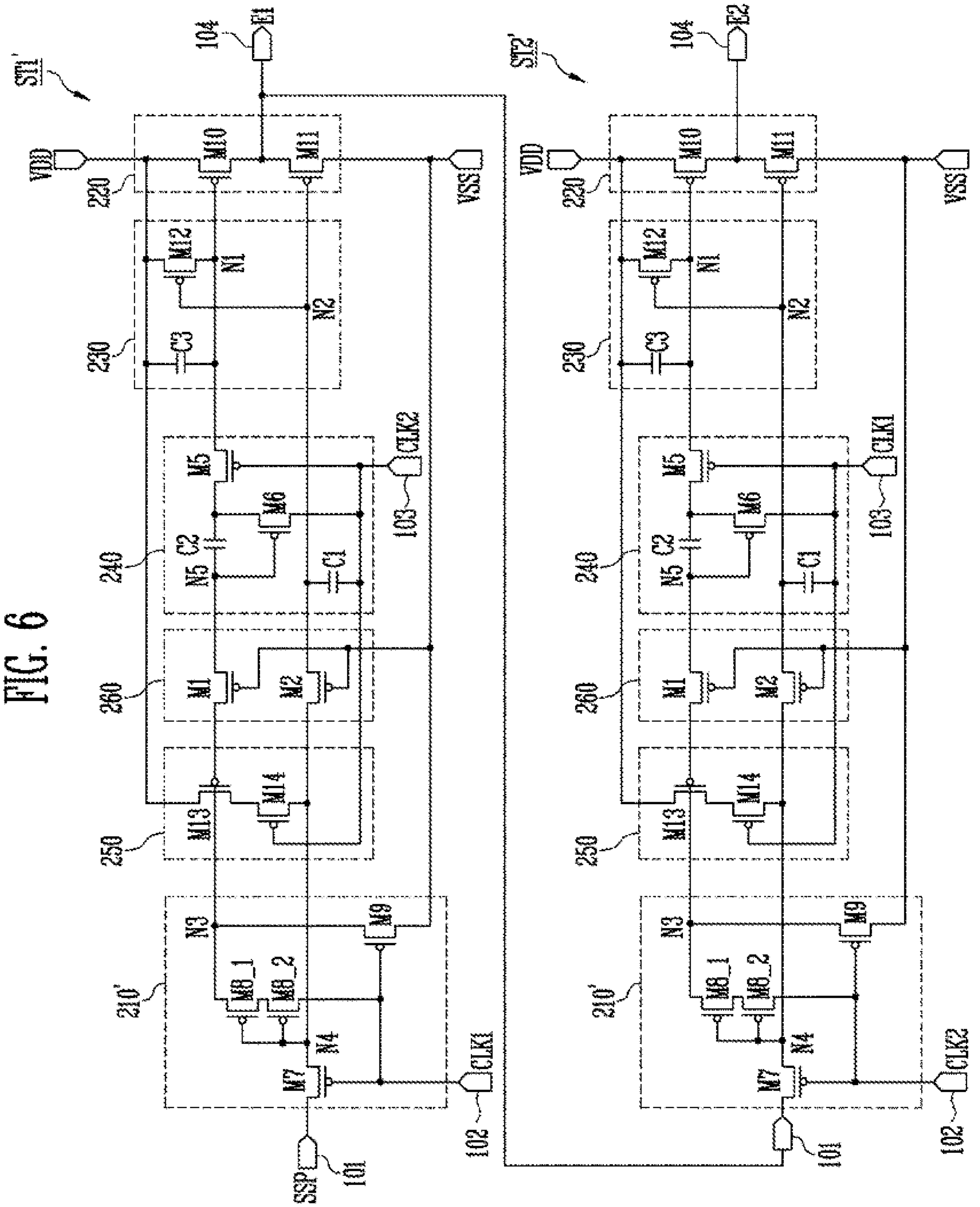
FIG. 6 illustrates another embodiment of a stage.

FIG. 6 illustrates another embodiment of the stage of FIG. 3. Referring to FIG. 6, a first stage ST1' includes an input unit 210, the output unit 220, the first signal processing unit 230, the second signal processing unit 240, the third signal processing unit 250, and the first stabilizing unit 260.

The input unit 210' controls the voltages of the third node N3 and the fourth node N4 based on the signals supplied to the first input terminal 101 and the second input terminal 102. For this purpose, the input unit 210' includes seventh through ninth transistors M7 through M9.

The seventh transistor M7 is connected between the first input terminal 101 and the fourth node N4. A gate electrode of the seventh transistor M7 is connected to the second input terminal 102. The seventh transistor M7 is turned on when the first clock signal CLK1 is supplied to the second input terminal 102 and electrically connects the first input terminal 101 and the fourth node N4.

The eighth transistors M8_1 and M8_2 are serially connected between the third node N3 and the second input terminal 102. Gate electrodes of the eighth transistors M8_1 and M8_2 are connected to the fourth node N4. The eighth transistors M8_1 and M8_2 are turned on or off based on the voltage of the fourth node N4.

The ninth transistor M9 is connected between the third node N3 and the second power source VSS. A gate electrode of the ninth transistor M9 is connected to the second input terminal 102. The ninth transistor M9 is turned on when the first clock signal CLK1 is supplied to the second input terminal 102 and supplies the voltage of the second power source VSS to the third node N3.

According to another embodiment, the configuration of the first stage ST1' is the same as in FIG. 4 except that the eighth transistors M8_1 and M8_2 are formed in order to reduce or minimize leakage current. The configuration of the second stage ST2' may be the same as the first stage ST1' except the signals supplied to the input terminals 101, 102, and 103.

Figure 7:
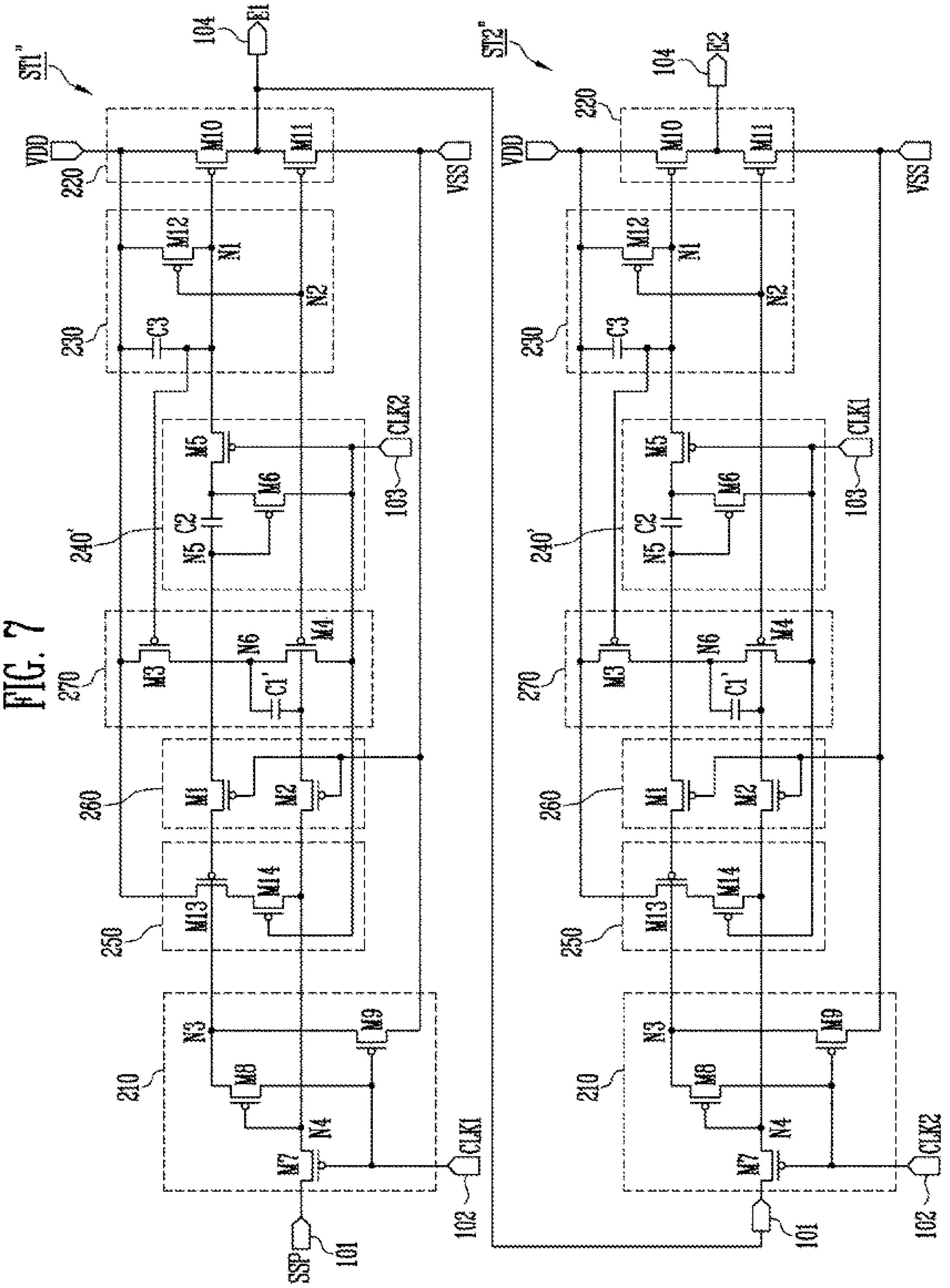
FIG. 7 illustrates another embodiment of a stage.

FIG. 7 illustrates another embodiment of the stage of FIG. 3. Referring to FIG. 7, the first stage ST1" includes the input unit 210, the output unit 220, the first signal processing unit 230, a second signal processing unit 240', the third signal processing unit 250, the first stabilizing unit 260, and a second stabilizing unit 270.

The second stabilizing unit 270 is connected to the first power source VDD, the first node N1, and the third input terminal 103. The second stabilizing unit 270 uniformly maintains the voltage of the second node N2 in a period in which the emission control signal is supplied to the output terminal 104. The second stabilizing unit 270 includes a third transistor M3, a fourth transistor M4, and a first capacitor C1'.

The third transistor M3 is connected between the first power source VDD and a sixth node N6 and has a gate electrode connected to the first node N1. The third transistor M3 is turned on or off based on the voltage of the first node N1.

The fourth transistor M4 is connected between the sixth node N6 and the third input terminal 103 and has a gate electrode connected to the second node N2. The fourth transistor M4 is turned on or off based on the voltage of the second node N2.

The first capacitor C1' is connected between the sixth node N6 and the second node N2.

The second signal processing unit 240 is connected to the fifth node N5 and controls the voltage of the first node N1 based on the signal supplied to the third input terminal. The second signal processing unit 240' includes a fifth transistor M5, a sixth transistor M6, and a second capacitor C2.

The second capacitor C2 has a first terminal connected to the fifth node N5 and a second terminal connected to the fifth transistor M5.

The fifth transistor M5 is connected between the second terminal of the second capacitor C2 and the first node N1. A gate electrode of the fifth transistor M5 is connected to the third input terminal 103. The fifth transistor M5 is turned on when the second clock signal CLK2 is supplied to the third input terminal 103 and electrically connects the second terminal of the second capacitor C2 and the first node N1.

The sixth transistor M6 is connected between the second terminal of the second capacitor C2 and the third input terminal. A gate electrode of the sixth transistor M6 is connected to the fifth node N5. The sixth transistor M6 is turned on or off based on the voltage of the fifth node N5.

The second signal processing unit 240' may have the same configuration as FIG. 4 except for the first capacitor C1.

The stage according to the present embodiment may be driven, for example, by the driving waveform of FIG. 5.

The fourth transistor M4 is turned on based on the voltage of the second node N2. For example, the fourth transistor M4 maintains a turn-on state in a period in which the second node N2 is set to have a low voltage. The fourth transistor M4 may be in a turn-on state before the fourth point of time t4 of FIG. 5 and after the sixth point of time t6 of FIG. 5.

When the fourth transistor M4 is in the turn-on state, and when the second clock signal CLK2 is supplied, the voltage of the second node N2 is reduced to a voltage lower than the voltage of the second power source VSS by coupling of the first capacitor C1' (at the third point of time t3).

On the other hand, the third transistor M3 is turned on based on the voltage of the first node N1. For example, the third transistor M3 maintains a turn-on state in a period in which the first node N1 is set to have a low voltage. The third transistor M3 maintains the turn-on state at the fifth point of time t5 and the sixth point of time t6 of FIG. 5.

When the third transistor M3 is turned on, the voltage of the first power source VDD is supplied to the sixth node N6. For example, in a period in which the emission control signal is supplied to the emission control line E1, the sixth node N6 maintains the voltage of the first power source VDD. When the sixth node N6 maintains the voltage of the first power source VDD, the second node N2 may stably maintain a high voltage.

In the stage of FIG. 4, the first capacitor C1 receives the second clock signal CLK2 supplied to the third input terminal 103 so that the voltage of the second node N2 is changed by the second clock signal CLK2. In a period between the fifth point of time t5 and the sixth point of time t6, the voltage of the second node N2 is changed by the second clock signal CLK2. As a result, operation reliability may deteriorate.

In the stage of FIG. 6, at the point of time t5 and the sixth point of time t6 of FIG. 5, a voltage of a first terminal of the first capacitor C1' is maintained as the voltage of the first power source VDD. Thus, the voltage of the second node N2 may be stably maintained.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The drivers, controllers, and other processing features described herein may be implemented in logic which, for example, may include hardware, software, or both. When implemented at least partially in hardware, the drivers, controllers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the drivers, controllers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A stage, comprising:

an output to supply a voltage of a first power source or a second power source to an output terminal based on voltages of a first node and a second node;

an input to control voltages of a third node and a fourth node based on signals supplied to a first input terminal and a second input terminal;

a first signal processor to control the voltage of the first node based on the voltage of the second node;

a second signal processor, connected to a fifth node, to control the voltage of the first node based on a signal supplied to a third input terminal; and a first stabilizer comprising a first transistor connected between the third node and the fifth node and having a gate electrode connected to the second power source, wherein the input comprises:

a plurality of eighth transistors serially connected between the third node and the second input terminal and having gate electrodes connected to the fourth node.

2. The stage of claim 1, wherein the input further comprises:

a seventh transistor connected between the first input terminal and the fourth node and having a gate electrode connected to the second input terminal; and a ninth transistor connected between the third node and the second power source and having a gate electrode connected to the second input terminal.

3. The stage of claim 1, wherein the first signal processor comprises:

a twelfth transistor connected between the first power source and the first node and having a gate electrode connected to the second node; and a third capacitor connected between the first power source and the first node.

4. The stage of claim 1, wherein the second signal processor comprises:

a second capacitor having a first terminal connected to the fifth node;

a fifth transistor connected between a second terminal of the second capacitor and the first node and having a gate electrode connected to the third input terminal; and a sixth transistor connected between the second terminal of the second capacitor and the third input terminal and having a gate electrode connected to the fifth node.

5. The stage of claim 4, wherein the second signal processor further comprises:

a first capacitor connected between the second node and the third input terminal.

6. The stage of claim 1, wherein the output comprises:

a tenth transistor connected between the first power source and the output terminal and having a gate electrode connected to the first node; and an eleventh transistor connected between the second power source and the output terminal and having a gate electrode connected to the second node.

7. The stage of claim 1, wherein the first stabilizer further comprises:

a second transistor connected between the second node and the fourth node and having a gate electrode connected to the second power source.

8. The stage of claim 1, further comprises:

a third signal processor to control the voltage of the fourth node based on the voltage of the third node and the signal supplied to the third input terminal.

9. The stage of claim 8, wherein the third signal processor comprises:

a thirteenth transistor connected to the first power source and having a gate electrode connected to the third node; and a fourteenth transistor connected between the thirteenth transistor and the fourth node and having a gate electrode connected to a third input terminal.

10. An organic light emitting display device, comprising:

pixels connected to emission control lines; and an emission driver comprising a plurality of stages to supply emission control signals to the emission control lines, wherein each of the stages comprises:

an output to supply a voltage of a first power source or a second power source to an output terminal based on voltages of a first node and a second node;

an input to control voltages of a third node and a fourth node based on signals supplied to a first input terminal and a second input terminal;

a first signal processor to control the voltage of the first node based on the voltage of the second node;

a second signal processor, connected to a fifth node, to control the voltage of the first node based on a signal supplied to a third input terminal; and a first stabilizer comprising a first transistor connected between the third node and the fifth node and having a gate electrode connected to the second power source, wherein the input comprises:

a plurality of eighth transistors serially connected between the third node and the second input terminal and having gate electrodes connected to the fourth node.

11. The organic light emitting display device of claim 10, wherein the input further comprises:

a seventh transistor connected between the first input terminal and the fourth node and having a gate electrode connected to the second input terminal; and a ninth transistor connected between the third node and the second power source and having a gate electrode connected to the second input terminal.

12. The organic light emitting display device of claim 10, wherein the first signal processor comprises:

a twelfth transistor connected between the first power source and the first node and having a gate electrode connected to the second node; and a third capacitor connected between the first power source and the first node.

13. The organic light emitting display device of claim 10, wherein the second signal processor comprises:

a second capacitor having a first terminal connected to the fifth node;

a fifth transistor connected between a second terminal of the second capacitor and the first node and having a gate electrode connected to the third input terminal; and a sixth transistor connected between the second terminal of the second capacitor and the third input terminal and having a gate electrode connected to the fifth node.

14. The organic light emitting display device of claim 13, wherein the second signal processor further comprises:

a first capacitor connected between the second node and the third input terminal.

15. The organic light emitting display device of claim 10, wherein the output comprises:

a tenth transistor connected between the first power source and the output terminal and having a gate electrode connected to the first node; and an eleventh transistor connected between the second power source and the output terminal and having a gate electrode connected to the second node.

16. The organic light emitting display device of claim 10, wherein the first stabilizer further comprises:

a second transistor connected between the second node and the fourth node and having a gate electrode connected to the second power source.

17. The organic light emitting display device of claim 10, wherein each of the stages further comprises:

a third signal processor to control the voltage of the fourth node based on the voltage of the third node and the signal supplied to the third input terminal.

18. The organic light emitting display device of claim 17, wherein the third signal processor comprises:

a thirteenth transistor connected to the first power source and having a gate electrode connected to the third node; and a fourteenth transistor connected between the thirteenth transistor and the fourth node and having a gate electrode connected to a third input terminal.

* * * * *